tively deep and oxidizable, especially on metals like cobalt. A relatively shallow layer of adherent nickel hydroxide, or a somewhat thicker layer of adherent cobalt hydroxide suffices to initiate deeper oxidation of the catalytic surface with more stable hypohalite solutions.

The reaction of the hypohalite compounds with the surface layers is quite autocatalytic and hence those agencies which initiate activation are useful. For instance, the more activatable compounds in or formed on the metal surfaces by proper pretreatments, during their reaction with the hypohalite solution initiate the activation or oxidation of the more difficultly activatable compounds or of the underlying metal itself. A relatively small quantity of hydrated oxidizable compound in a surface layer may suffice without further treatment to initiate hypohalite activation, as when reactivating a nickel surface prepared according to my invention and used for hydrogenation at lower temperatures. Under such conditions successive reactivations are generally accompanied by increases of the depth of the surface layer and receptivity to activation.

*Example 3*

A highly active catalyst for hydrofining organic compounds is made as follows:

A new nickel or nickel coated mass is pretreated several hours with the vapors of concentrated nitric acid at about 40° C. or 50° C. to pit the surface and to form a surface layer containing nickel nitrate. The surface layer, without washing, is then dried and gently heated in a current of air at near the lowest temperature required to evolve fumes and decompose a substantial portion of the resulting nickel nitrate and darken the mass, for instance at about 300° C. The resulting surface layer is a moderately catalytic form of nickel, and is further activated by contacting with a less stable hypohalite than the one given in Example 1 in order to initiate the oxidation, as for instance, a more concentrated solution of hypohalite. Specifically, the pretreated nickel mass is immersed in a highly alkaline aqueous solution maintained at room temperature consisting principally of sodium hypobromite and a lesser weight of sodium hydroxide, but sufficient to inhibit the hydrolysis of the sodium hypobromite. The total concentration of the solution is that at which the activity coefficient is about a minimum. If blackening does not begin within a few minutes, the stability of the alkaline hypobromite solution is decreased as by gentle heating without boiling until the blackening is initiated. Then as the reaction proceeds the stability of the alkaline hypobromite solution may be increased as by cooling or decreasing the hypobromite concentration of the solution and the blackening of the catalytic surface, continued as in Example 1. The blackened mass is then withdrawn, drained and washed as given in Example 1.

*Example 4*

A new cobalt or cobalt coated mass is pretreated several hours with the vapors of a concentrated nitric acid at about 30° C. or 40° C. to pit the surface and to form a surface layer containing cobalt nitrate. The surface layer, without washing, is then dried and gently heated in a current of air at near the lowest temperature required to evolve fumes and decompose most of the resulting cobalt nitrate, for instance at about 300° C. Such moderately catalytic surface is further activated by contacting with a hypohalite similar in stability to that described in Example 3. The blackened mass is then withdrawn, drained and washed as given in Example 1.

A decomposed cobalt nitrate surface may be electrolytically treated, followed by hypobromite oxidation and washing as given in Example 1 or 2. Other metals may be activated in the same manner, for example a decomposed nickel nitrate surface may be treated instead of the new cobalt mass given in Example 1.

Slaked lime, strontia and baryta solutions may be used together with hypohalites in the reactivation of spent and sulphided or sulphated catalytic surface layers. These solutions interact with the sulphur compounds to form sulphates which precipitate. The resulting calcium, strontium or barium sulphate precipitate may be separated, reconverted to its hydroxide and reused. For instance strontium sulphate or barium sulphate may be converted to the hydroxides through their carbonates, or by way of calcium sulphate. The alkaline earth hydroxides when used to produce the alkalinity of the hypohalite solutions are used in excess of the amount necessary to produce the correct alkalinity because a part of the hydroxide is used up as a reagent to form the sulphate precipitate. The alkaline earth hypohalite treatment is preferably followed by further activation with sodium hypohalite together with a molar concentration of sodium hydroxide in excess of that of the sodium hypohalite. Otherwise when the surface layers are heavily sulphided, the major part of the sulphur is preferably removed before hypohalite reactivation. For instance, I may treat a sulphided nickel catalyst in a manner similar to that described in Example 3, but heating the nitric acid nickel nitrate layer at a temperature higher than 300° C. The decomposed nitrate layer may be treated again with nitric acid and heated to a temperature of about 300° C. or 350° C. before cooling and hypohalite treating.

After the hypohalite treatment, the surface layer may be further chemically treated, for instance after the final washing in Examples 2 or 3 or 4, the catalyst may be dipped in a strong acqueous solution of chromic acid or ammonium molybdate or thiomolybdate, then withdrawn and allowed to drain.

Before reactivating catalyst used for hydrogenating and/or purifying fatty or like compounds, the latter compounds or impurities may be removed or extracted as by refluxing with volatile hydrocarbons. Or more polar solvents such as dichlorethylene or acetone may be used particularly for a final extraction or when using the catalyst as a purifying agent.

Catalytic surfaces to be treated do not have to be disturbed for reactivation. If a vessel is lined with a catalytic surface, such liners may be activated. In the preparation of fixed catalyst on metal, the metal prior to chemical activation may be machined so as to produce burrs or grooves or may be worked as with heat and/or alloying to produce fine longitudinal cracks. Fixed catalyst such as a foraminate base metal or rough inert solid whose surfaces contain nickel or cobalt or like metal, or catalytic surfaces prepared by the various methods of the art, may be activated or reactivated according to my invention. An assembly such as described in my copending application Serial Number 86,741, filed June 23, 1936, may be activated according to my invention. The solvent action of hypohalite solutions on the catalytic surfaces may be diminished by other methods than my alkali control. For instance when the excess alkalinity with respect to the hypohalite salt is relatively small, that is when the molar concentration of alkali hydroxide does not greatly exceed that of the hypohalite salt, the solvent action of the free hypohalous acid by hydrolysis may be minimized by an unusual short time of contact so that the oxidized surface layer is relatively shallow, for example on the order of $10^3$ metal atoms. Or a surface layer may be contacted with a hypohalite compound in vapor form.

A hypohalite treatment may be accompanied by other oxidizing agents or treatments. For instance wet oxygen or air may be mixed with gaseous hypofluorous anhydride ($OF_2$) and the mixture used to activate catalytic surfaces in the vapor phase. Or a surface layer undergoing activation may be treated with both air and a hypohalite solution. For instance an alkaline hypobromite solution may be continuously or intermittently sprayed over the surface undergoing activation. Of the surface layers may be wetted with an alkaline solution and then exposed to a halogen gas, with or without air.

Hypobromite and like solutions may be agitated and/or continuously recirculated through the mass undergoing activation to be continuously regenerated, e. g., electrolytically, or the mass to be activated may be made the anode as with cobalt or be placed in the anolyte of such a solution undergoing regeneration or of a fresh solution, e. g., a solute or sodium hydroxide and sodium bromide. The electrolyte conversion or regeneration to hypobromite is incomplete and is preferably done under conditions minimizing the formation of bromate, for instance by maintaining in the anolyte a low concentration of hypobromite and a low activity coefficient concentration of alkali, and minimizing the evolution of oxygen at the anode. Otherwise in the activating solutions, particularly when fresh or unused, I prefer that the inactive anions be maintained at a minimum. Active anions comprise hypohalite and hydroxyl ions.

The bromine of spent solutions may be recovered, e. g., by weakly acidifying and displacing with chlorine, especially useful for the large scale recovery of bromine from wash water.

What I claim is:

1. A process for preparing a highly active adherent catalytic surface useful in hydrofining, which comprises activating a surface whose metal component is selected from the class which consists of nickel, cobalt, and a ferromagnetic and readily reducible alloy, with a highly alkaline hypohalite solution whose pH is greater than approximately 12 and whose thermodynamic activity coefficient is less than about unity.

2. A method as described in claim 1, in which the hypohalite halogen is selected from the group which consists of chlorine and bromine, and in which the hypohalite treatment is followed by washing of said surface to substantially remove the compounds of said halogen.

3. A process for preparing a highly active adherent catalytic surface useful in hydrofining, which comprises activating a surface previously subjected to an oxidizing treatment and whose metal component is selected from the class which consists of nickel, cobalt, and a ferromagnetic and readily reducible alloy, with a relatively stable hypohalite solution whose pH is greater than approximately 12 and whose thermodynamic activity coefficient is less than about unity.

4. A process as described in claim 3 in which the hypohalite solution contains at least one molar concentration of alkali hydroxide in excess of the original concentration of the hypohalite salt and sufficient to repress the hydrolysis of the hypohalite salt to free hypohalous acid.

5. A method of activating catalytic surfaces whose metal component is selected from a class which consists of nickel, cobalt, and a ferromagnetic and readily reducible alloy, which comprises preparing an adherent catalytic surface by contacting the surface in an oxidizable and foraminate state, with an alkaline relatively stable hypohalite solution whose pH is greater than approximately 12 and whose thermodynamic activity coefficient is less than about unity.

6. A method of activating catalytic surfaces whose metal component is selected from the class which consists of nickel, cobalt, and ferromagnetic and readily reducible alloy, which comprises the steps of gently roasting the surface until substantially converted to the oxide of the catalytic metal, and subsequently further oxidizing the surface with a relatively stable hypohalite solution whose pH is greater than approximately 12 and whose thermodynamic activity coefficient is less than about unity.

7. A process for preparing a highly active and adherent catalytic surface which comprises treating a surface with the vapors of nitric acid to form a surface layer containing a nitrate of the catalytic metal, said metal being selected from the class which consists of nickel, cobalt, and a ferromagnetic and readily reducible alloy, then gently heating said surface at near the lowest temperature required to evolve fumes and decompose most of the nitrate of the catalytic metal, and further treating the surface with a relatively stable hypohalite solution whose pH is greater than approximately 12 and whose thermodynamic activity coefficient is less than about unity.

8. A process for preparing a highly active and and adherent catalytic surface which comprises the steps of forming a surface layer which contains an oxidizable hydrated compound of a metal selected from the class which consists of nickel, cobalt, and a ferromagnetic and readily reducible alloy, and subsequently treating the surface with a highly alkaline relatively stable hypohalite solution whose pH is greater than approximately 12 and whose thermodynamic activity coefficient is less than about unity.

9. A highly catalytic metallic surface for the hydrofining of volatile carbonaceous compounds whose metal component is selected from the class which consists of nickel, cobalt, and a ferromagnetic and readily reducible alloy, and which is activated by treating the surface with a highly alkaline hypohalite solution whose pH is greater than approximately 12 and whose thermodynamic activity coefficient is less than about unity, said surface having been subjected to an oxidizing treatment prior to the hypohalite treatment.

MARION H. GWYNN.

CERTIFICATE OF CORRECTION.

Patent No. 2,191,464.                                           February 27, 1940.

MARION H. GWYNN.

It is hereby certified that error appears in the above numbered patent requiring correction as follows: In the grant, line 6, and in the heading to the printed specification, line 2 thereof, title of invention, for the word "actuating" read --activating--; page 1, second column, lines 18, 19, and 20, strike out "Of the several hypomore adherent surfaces. Of the several hypobromites" and insert instead --Of the several hypohalites in similar equimolecular solutions, hypobromites--; page 3, second column, line 49, for "acqueous" read --aqueous--; and that the said Letters Patent should be read with this correction therein that the same may conform to the record of the case in the Patent Office.

Signed and sealed this 9th day of July, A. D. 1940.

(Seal)                                                                           Henry Van Arsdale,
                                                                              Acting Commissioner of Patents.

CERTIFICATE OF CORRECTION.

Patent No. 2,191,464. February 27, 1940.

MARION H. GWYNN.

It is hereby certified that error appears in the above numbered patent requiring correction as follows: In the grant, line 6, and in the heading to the printed specification, line 2 thereof, title of invention, for the word "actuating" read --activating--; page 1, second column, lines 18, 19, and 20, strike out "Of the several hypomore adherent surfaces. Of the several hypobromites" and insert instead --Of the several hypohalites in similar equimolecular solutions, hypobromites--; page 3, second column, line 49, for "acqueous" read --aqueous--; and that the said Letters Patent should be read with this correction therein that the same may conform to the record of the case in the Patent Office.

Signed and sealed this 9th day of July, A. D. 1940.

(Seal)

Henry Van Arsdale,
Acting Commissioner of Patents.